United States Patent [19]

Kilgus, deceased et al.

[11] 4,147,113
[45] Apr. 3, 1979

[54] TIE-DOWN WINCH

[76] Inventors: Donald C. Kilgus, deceased, late of Grosse Pointe Woods, Mich., by Marjorie M. Kilgus, executrix, 1288 Fairholme Rd., Grosse Pointe Woods, Mich. 48236

[21] Appl. No.: 823,661
[22] Filed: Aug. 11, 1977
[51] Int. Cl.² .............................................. B60P 7/08
[52] U.S. Cl. .................................. 105/477; 105/368 T
[58] Field of Search ............... 105/477, 368 T, 473; 254/161, 166; 248/503; 24/230.5 TD

[56] References Cited

U.S. PATENT DOCUMENTS

| 3,120,375 | 2/1964 | Haynes | 105/477 X |
| 3,650,222 | 3/1972 | Broling et al. | 105/368 T X |
| 3,715,994 | 2/1973 | Mietla | 105/368 T |
| 3,842,754 | 10/1974 | Jones | 105/368 T |

Primary Examiner—Albert J. Makay
Attorney, Agent, or Firm—Olsen and Stephenson

[57] ABSTRACT

A tie-down winch is provided for use in a vehicle tie-down system to hold a vehicle on the deck of a transport. The tie-down winch cooperates with a longitudinally extending channel that is secured to the deck of the transport to place in tension a tie-down member that is connected to a vehicle to secure the vehicle on the transport. The channel has opposed upright wall members, one of which has a plurality of longitudinally spaced openings formed therethrough. A fixed position pin member extends transversely of the winch and projects into one of the channel openings to position the winch in a selected position in the channel. The winch can be pivoted to withdraw the pin.

7 Claims, 7 Drawing Figures

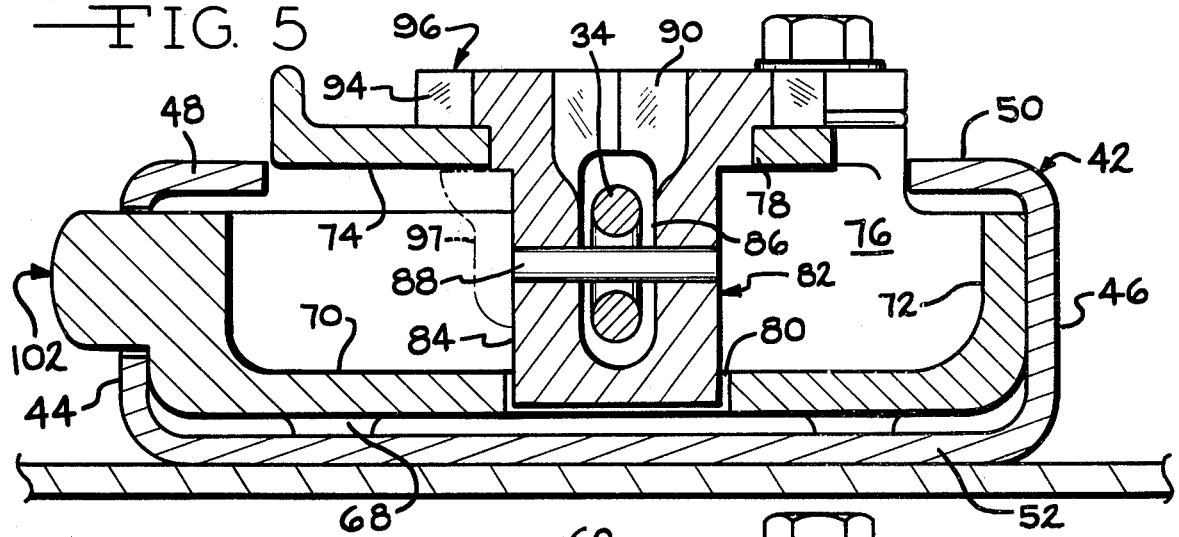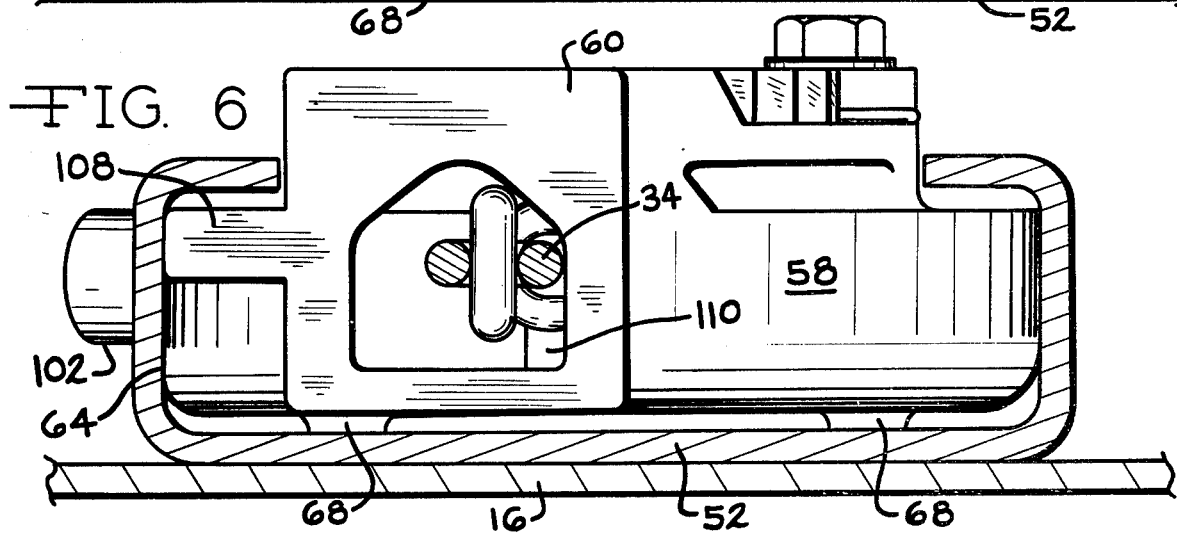

TIE-DOWN WINCH

BACKGROUND OF THE INVENTION

The present invention relates generally to a tie-down winch which forms a component of a vehicle tie-down system, and more particularly, to a tie-down winch having an improved locking means for securing the winch at a desired location on the deck of a transport.

The tie-down winch of the present invention is generally used in a vehicle tie-down system like a system disclosed, for example, in this inventor's copending application Ser. No. 703,594, filed July 8, 1976. The winch functions to take up a chain that is connected to a vehicle to hold the vehicle on the deck of a transport and is movably mounted to a selected position in a channel that is secured to the deck of the transport.

Tie-down winches have been provided in the past with locking assemblies for engaging the channel or similar structure on the transport to hold the winch in a desired position. The locking assemblies of this type are constructed having a spring loaded movable pin member that is extended into one of the wall openings. To unlock the winch, the user retracts the pin against the force of the spring thereby enabling movement of the winch longitudinally of the channel. A winch having this type of locking mechanism is disclosed in U.S. Pat. No. 3,650,222, issued on Mar. 21, 1972.

Locking assemblies with movable components are susceptible to being jammed, have a tendency to wear out quickly in use, and are subject to all the problems associated with mechanisms having moving parts. It is an object, therefore, of the present invention to provide a tie-down winch having an improved locking system for maintaining the winch in a desired position.

SUMMARY OF THE INVENTION

In accordance with the present invention, a tie-down winch having an improved locking system is provided for use with a vehicle tie-down system. The tie-down system includes a channel secured to the deck of a transport and having spaced apart upright walls. A plurality of longitudinally spaced openings are formed in one of the channel walls to cooperate with the winch locking system to restrain movement of the winch longitudinally with respect to the channel.

The tie-down winch is adapted for positioning between the wall members of the channel and is movable between positions engaged with and disengaged from the channel. A locking system is mounted on the winch and includes a fixed position pin member that is integrally formed with and extends transversely of the winch body. A rib member is formed on the winch and projects outwardly from the side of the winch body to engage one of the channel walls when the winch is in the engaged position.

To move the winch along the channel, the winch body is pivoted to a disengaged position in which the pin member extends in a direction longitudinally of the channel. To secure the winch in the engaged position, the body is pivoted in a reverse direction to project the pin member into one of the openings in the wall member thereby restraining the winch from further longitudinal movement along the channel. When pulling forces are exerted on the winch as the tie-down chain is being tightened, the rib member engages the wall and cooperates with the pin member to prevent the winch from pivoting.

The pin member terminates in an inclined end surface. When the winch is pivoted to the disengaged position, the inclined surface of the pin member is generally parallel to the adjacent channel wall so that a sufficient clearance exists between the pin member and the wall to enable movement of the winch body longitudinally along the channel.

The winch of the present invention also includes a rotatable capstan about which the pull chain in the tie-down system is wound. The winch body is configured to efficiently guide the chain onto the capstan during tightening of the chain to insure the efficient generation of the necessary tie-down forces.

The result is a readily adjustable and reliable winch that is effective in generating the necessary tie-down forces in a tie-down system.

DETAILED DESCRIPTION OF THE INVENTION

Further objects, features, and advantages of the present invention will become apparent from a consideration of the following description, when taken in connection with the appended claims and the accompanying drawing in which:

FIG. 5 is an enlarged sectional view of the tie-down winch taken substantially along the line 5—5 in FIG. 4;

FIG. 6 is a front view of the tie-down winch of the present invention as seen from substantially the line 6—6 in FIG. 4; and FIG. 7 is a top plan view of a modified form of the tie-down winch of the present invention.

Figure 1:
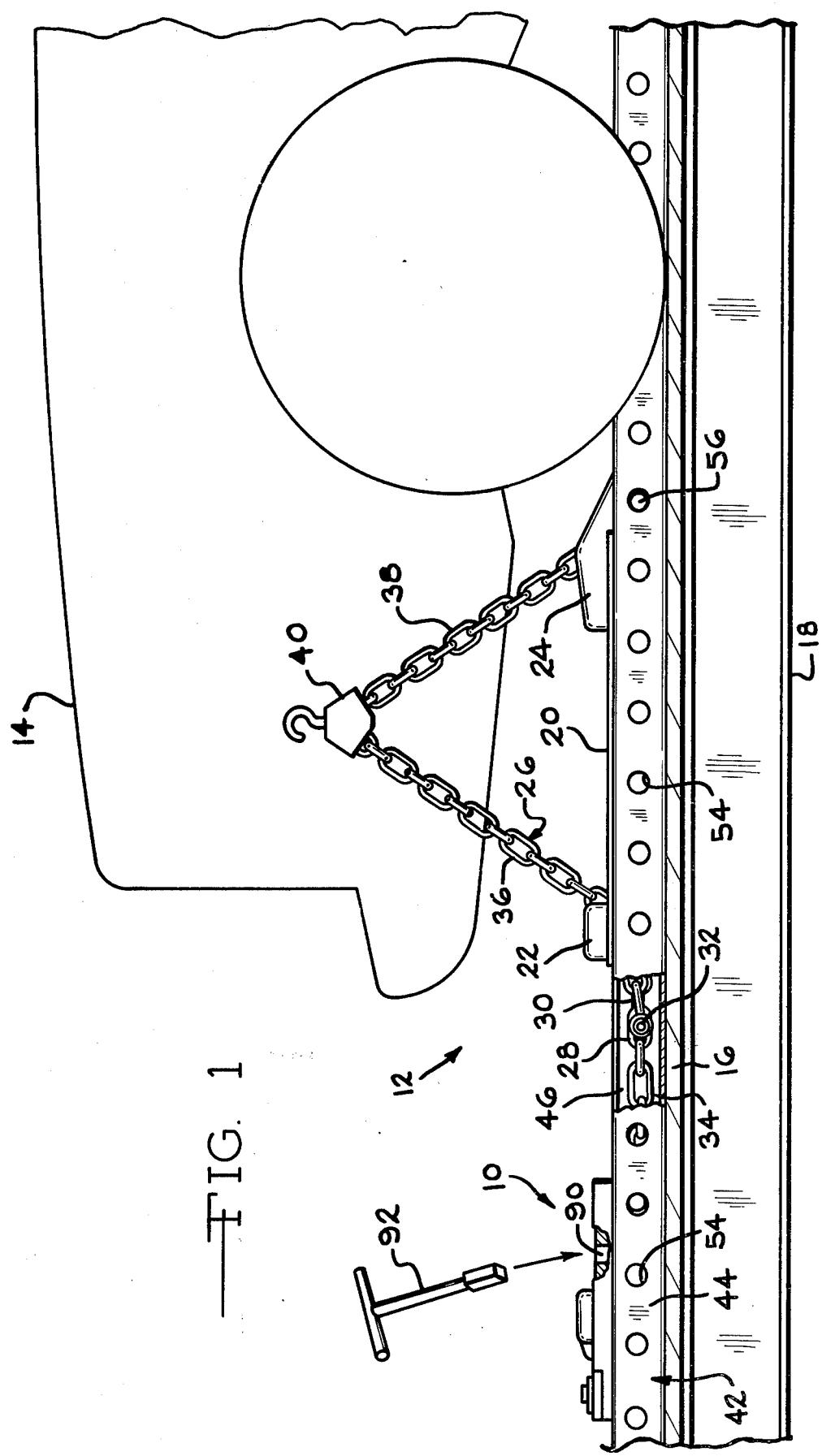
FIG. 1 is a foreshortened elevational view of a vehicle tie-down system that includes the tie-down winch of the present invention for holding a vehicle on the deck of a transport system.

Referring to the drawing, the tie-down winch of the present invention, indicated generally at 10, is shown in FIG. 1 as a component of a vehicle tie-down system 12 which functions to hold a vehicle 14, only a front end portion of which is shown, on a deck 16 of a transport 18 such as a rail car or the like.

Figure 2:
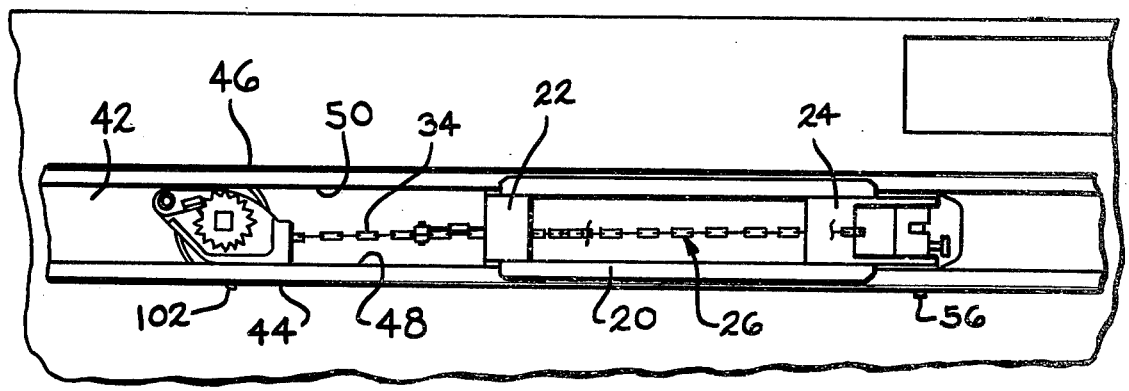
FIG. 2 is a top plan view of a portion of the vehicle tie-down system shown in FIG. 1.

The vehicle tie-down system 12 is fully disclosed in copending application Ser. No. 703,594, filed on July 8, 1976 and will be described here only to the extent necessary to describe the use of the tie-down winch 10 of the present invention. The tie-down system 12 (FIGS. 1 and 2) includes an idler body 20 having front and rear idler portions 22 and 24, respectively. The portions 22 and 24 are positioned a fixed distance apart and are slidably engaged by a flexible tie-down member such as a chain 26. The chain 26 has ends 28 and 30 that are connected by a pin 32 to a pull chain 34 that is secured to the winch 10.

The chain 26 has inclined sections 36 and 38 and is connected intermediate its ends 28 and 30 by a connector body 40 to a suitable location of the underside of the vehicle 14. When connected to the vehicle 14, the chain 26 forms a triangular configuration with the sections 36 and 38 forming inclined sides of the triangular configuration. As the ends 28 and 30 of the chain 26 are pulled toward the winch 10, the chain section 36 slides across the support portion 22 and the chain section 38 slides across the support portion 24 pulling down the connector body 40 along with the vehicle 14.

The winch 10 and idler body 20 are movably positioned in guide means in the form of a longitudinally extending channel 42 that is secured to the deck 16 of the transport 18. The channel 42 includes spaced apart upright wall members 44 and 46. Inwardly extending retainer flanges 48 and 50 (FIG. 2) are formed at the top of the wall members 44 and 46, respectively, to restrain upward movement of the winch 10 and the idler body 20. The wall members 44 and 46 have a horizontal base 52 (FIG. 5) extending therebetween on which the winch 10 and the idler body 20 are slidably supported.

A plurality of openings 54 are formed in the wall member 44 and cooperate with locking means on the winch 10 and the idler body 20 to restrain each from longitudinal movement along the channel 42. The idler body locking system includes a spring loaded pin 56 (FIG. 1) which is movable between an extended position in an opening 54 and a retracted position out of engagement with the opening 54. In this manner the idler body 20 can be located and fixed in a desired position along the channel 42.

The tie-down winch 10, as viewed in FIGS. 3–6, includes a main body member 58 having a front portion 60, a rear portion 62 and side portions 64 and 66. The body member 58 has a generally circular shape at its border and is of a diameter that is less than the distance between the channel walls 44 and 46 so that the winch 10 can be easily moved longitudinally of the channel 42 and pivoted between the walls 44 and 46. The retaining flanges 48 and 50 (FIG. 5) overlap the border portions of the winch body 58 to keep the body 58 in the channel 42. The body 58 also has depending leg portions 68 for supporting the winch 10 on the base 52 of the channel 42.

The body 58 is formed with a central cavity 76 having a bottom wall 70 and an outer peripheral side wall 72. A top wall member 74 is mounted on the body 58 and together with the bottom wall 70 and the side wall 72 defines the cavity 76 in which the pull chain 34 is located.

An opening 78 is formed through the top wall 74 at a position in vertical alignment with an opening 80 formed in the bottom wall 70. A capstan 82 which can be rotated is mounted on the top wall 74 and projects into the openings 78 and 80. As most clearly seen in FIG. 5, the capstan 82 comprises a generally cylindrical body member 84 having a slot 86 therein for holding a link of chain in a generally upright position. A pin 88 extends through the body 82 at a position perpendicular to the plane in which the slot 86 is positioned so that when a link in a chain is placed in the slot 86, the pin 88 secures the chain to the capstan 82.

The capstan 82 is also provided with a generally rectangular axial cavity 90 adapted to receive any suitable tool such as a T-shaped tool 92 (FIG. 1) for turning the capstan member 82 to take up the pull chain 34. A plurality of teeth 94 are formed about the top of the capstan 82 to form a ratchet wheel 96. A pawl 98 coacts with the ratchet wheel 96 only, as viewed in FIG. 3, when the pawl 98 is engaged with the ratchet wheel 96. The pawl 98 is pivotally secured to the top wall 74 on the winch body 58 by a pin 100 and is biased into engagement with the ratchet 96 by a conventional spring (not shown). When the pawl 98 is pivoted out of engagement with the ratchet wheel 96, the capstan 82 is free to rotate in opposite directions.

The ratchet wheel 96 rides on the top wall 74 and an ear shown in broken lines at 97 in FIG. 5 can be mounted on the body 84 to extend outwardly beneath the top wall 74. The ear 97 functions to restrain upward movement of the body 84 out of the cavity 76. A suitable opening (not shown) can be formed in the top wall 74 to enable the capstan 82 to be removed when the ear 97 and the opening are in alignment.

The winch 10 is provided with locking means for holding the winch 10 in a desired position along the channel 42. A pin member 102 extends transversely from the side 64 of the winch body 58 and terminates in an inclined surface 105 having a front portion 104 and a rear portion 106 that is located closer to the side 64 than the front portion 104. The pin member 102 is adapted to be positioned in one of the openings 54 in the channel wall 44 to restrain longitudinal movement of the winch 10 along the channel 42.

A second member 108 in the form of an extending rib is integrally formed with the winch body 58 at the side portion 64 and is positioned forwardly of the pin member 102. The rib 108 engages the wall 44 at a position forwardly of the pin member 102 when the pin member 102 is positioned in one of the openings 54 thereby cooperating with the pin member 102 which frictionally engages the wall 44 at the opening 54 to prevent the winch 10 from pivoting when pulling forces are exerted on the winch 10 through the pull chain 34.

An idler opening 110 (FIG. 6) is formed in the front portion 60 of the winch body 58 and functions as a guide means for the pull chain 34. The idler opening 110, as viewed in FIG. 6, is offset horizontally from the central portion of the body 58. In other words, the opening 110 is positioned horizontally between the capstan 82 and the body member side portion 62 to facilitate the winding and unwinding of the chain 34 about the capstan 82.

Figure 3:
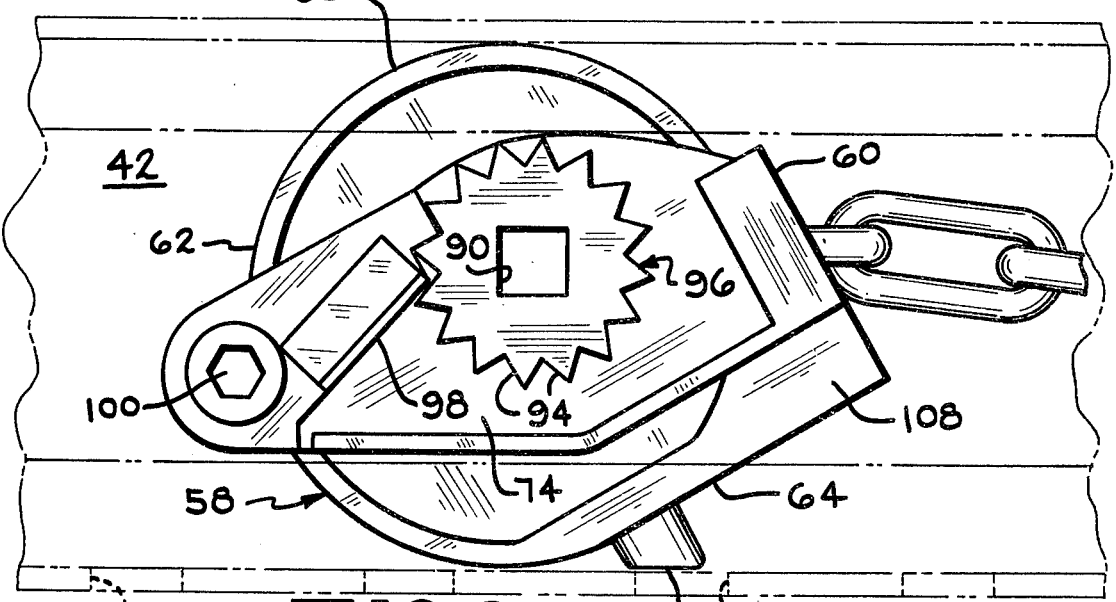
FIG. 3 is a top plan view of the tie-down winch of the present invention shown in a position disengaged from its supporting channel.
Figure 4:
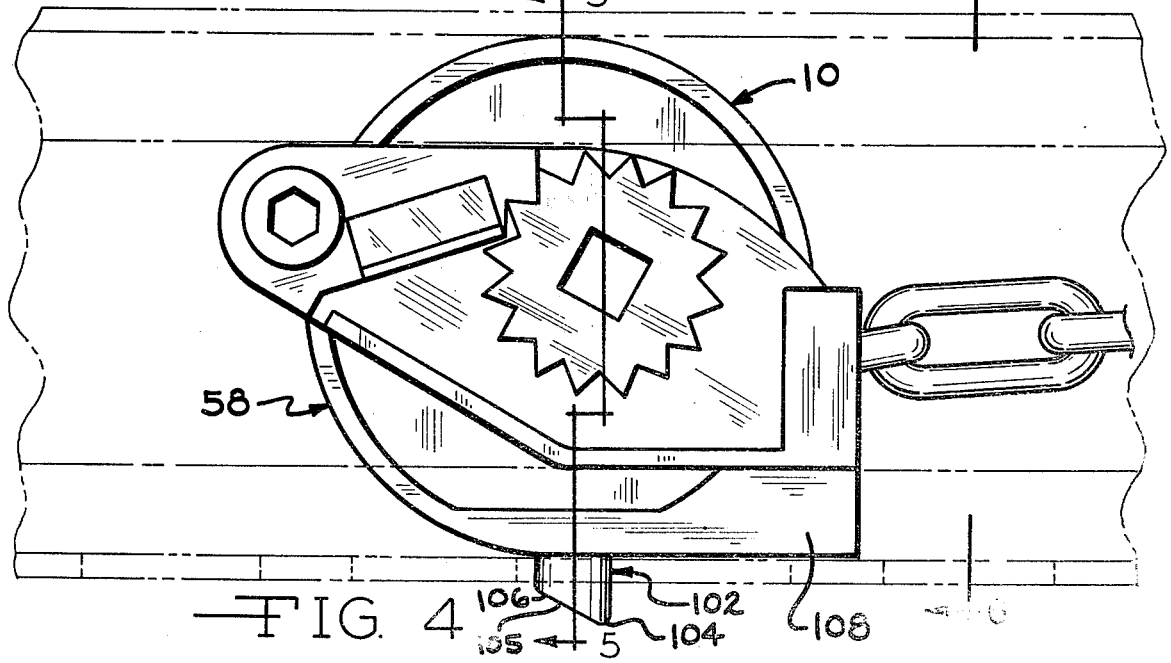
FIG. 4 is a top plan view of the tie-down winch shown in a position engaged with the channel.

The winch body 58 can be pivoted between a position disengaged from the channel 42, as shown in FIG. 3, and a position engaged with the channel 42, as shown in FIG. 4. In the disengaged position, the body 58 is in a position in which the end surface 105 of the pin member 102 is substantially parallel to the channel wall 44. It can be seen that the inclination of the surface 105 enables the winch 10 to be pivoted through a reduced angle in order for the pin member 102 to be removed from an opening 54. The angled surface 105 also permits the use of relatively small openings 54 in which positioning and withdrawal of the pin member 102 can be readily achieved. In the disengaged position, the winch 10 can be easily moved longitudinally of the channel 42 to a desired position.

When in a desired position in the channel 42, the winch 10 is pivoted clockwise from the disengaged position (FIG. 3), to the engaged position in which the pin 102 is positioned in one of the openings 54. In the engaged position, the rib 108 abuts the wall 44 at positions on the wall 44 forwardly of the pin member 102 so that when pulling forces are exerted on the winch 10, it will remain in its adjusted engaged position without being pivoted. Accordingly, in the engaged position, a tie-down winch 10 is securely held in place so that the pull chain 34 may be placed in tension to pull the vehicle 14 down on the deck 16. Any tendency of the body 58 to be rotated clockwise as viewed in FIG. 4 about the forward edge of pin 102 by the pulling force of chain 34 on capstan 82 is prevented by the engagement of rib 108 with channel wall 54.

A modified form of the tie-down winch of this invention, indicated generally at 10a, is shown in FIG. 7. The winch 10a is identical in all respects to the winch 10 except that in addition to the structure of the winch 10, the winch 10a includes a second rib member 112 mounted on the side portion 66. The rib 112 is located at a position rearwardly of the pin member 102 and cooperates with the pin member 102 to prevent pivoting of the body 58 when pulling forces are applied to the winch 10a. In the modified winch 10a, the rib 112 cooperates with the rib 108 to resist the pivoting forces produced on the body 58 by the chain 34.

It can thus be seen that an improved tie-down winch 10 is provided that is readily movable to a desired position in the channel 42. Once in the desired position, the winch 10 is readily maintained in that position by the cooperative action of the pin 102 and rib 108 during action of the winch 10 to pull the chain 34.

A specific vehicle tie-down has been illustrated and described in which the winch 10 of the present invention is incorporated. It is to be understood, however, that the winch 10 is readily usable in a variety of vehicle tie-down systems and that the invention is not to be limited by the specific structure shown, but rather it is to be limited only by the following claims.

What is claimed:

1. A tie-down winch for use in a vehicle tie-down system and in combination with longitudinally extending guide means adapted to be secured to a transport vehicle, said guide means including upright wall members having means forming a plurality of longitudinally spaced apart openings therein, said winch including a body member, a fixed projection on said body member extending into one of said wall openings to restrain movement in one direction of said winch longitudinally of said wall member, and abutment means including a flat surface in one quadrant of said body member engaging said wall member at a position spaced forwardly of said projection and cooperating therewith to restrain pivoting of said body member about said projection when forces are exerted on said body member in said one direction, said body member being curved in quadrants adjacent to said one quadrant to allow for assembly and disassembly within the guide means.

2. The tie-down winch according to claim 1 wherein said abutment means comprises a rib member formed integral with said body.

3. The tie-down winch according to claim 2 wherein said body has side and front and rear portions, said projection extending from said body in a transverse direction from one of said side portions thereof and said rib member projecting transversely forwardly of said projection.

4. The tie-down winch according to claim 3 wherein said projection terminates in a surface inclined relative to said wall members in an engaged position of said body member.

5. The tie-down winch according to claim 4 wherein said surface is inclined toward said rear portion of said winch body, said surface being positioned parallel with said wall members in said disengaged position of said winch body to enable movement of said body longitudinally of said guide means.

6. The tie-down winch according to claim 5 further including a capstan member rotatably mounted on said winch body and adapted to be connected with a flexible tie-down member, said body member being hollow and having an idler opening at the front portion thereof through which the flexible member extends, said idler opening being offset to one side of said capstan member, and coacting ratchet and pawl means on said capstan and said winch body enabling rotation of said capstan in one direction.

7. A tie-down winch for use in a vehicle tie-down system and in combination with a longitudinally extending channel adapted to be secured to a transport vehicle, said channel having spaced apart upright walls and having means forming a plurality of longitudinally spaced apart openings in at least one of said walls, said tie-down winch including a body member movable longitudinally of said channel between said wall members, a fixed projection on said winch body for engaging one of said walls at one of said openings therein to restrain movement of said winch body longitudinally of said channel, a first abutment member in one quadrant of said winch body, and a second abutment member on said winch body in a quadrant diametrically opposite said first quadrant, said winch body being movable between a position disengaged from said walls and a position engaged with said walls in which said fixed projection is disposed in one of said openings and in which said first and second abutment members engage said spaced apart walls to prevent a pivoting of said winch body in said engaged position, the remaining quadrants of said winch body being curved to allow for assembly and disassembly with the channel.

* * * * *